United States Patent [19]

Huang et al.

[11] Patent Number: 5,181,170
[45] Date of Patent: Jan. 19, 1993

[54] HIGH EFFICIENCY DC/DC CURRENT SOURCE CONVERTER

[75] Inventors: Xianrui Huang; Yehia M. Eyssa, both of Madison, Wis.

[73] Assignee: Wisconsin Alumni Research Foundation, Madison, Wis.

[21] Appl. No.: 816,381

[22] Filed: Dec. 26, 1991

[51] Int. Cl.$^5$ .......................................... H02M 3/335
[52] U.S. Cl. ........................................ 363/21; 363/97; 363/14
[58] Field of Search ............................. 363/14, 16–26, 363/95–97

[56] References Cited

U.S. PATENT DOCUMENTS

| | | |
|---|---|---|
| 3,443,195 | 5/1969 | Hoffman, Jr. et al. . |
| 4,055,791 | 10/1977 | Bland et al. . |
| 4,079,305 | 3/1978 | Peterson et al. . |
| 4,122,512 | 10/1978 | Peterson et al. . |
| 4,184,197 | 1/1980 | Cuk et al. . |
| 4,253,136 | 2/1981 | Nanko . |
| 4,318,164 | 3/1982 | Onodera et al. . |
| 4,336,583 | 6/1982 | Campbell et al. . |
| 4,386,394 | 5/1983 | Kocher et al. . |
| 4,415,959 | 11/1983 | Vinciarelli . |
| 4,441,146 | 4/1984 | Vinciarelli . |
| 4,481,565 | 11/1984 | Colton . |
| 4,486,823 | 12/1984 | Palm . |
| 4,493,014 | 1/1985 | Higashino ............................ 363/14 |
| 4,499,531 | 2/1985 | Bray . |
| 4,546,421 | 10/1985 | Bello et al. . |
| 4,584,518 | 8/1986 | Higashino et al. ................ 363/14 X |
| 4,609,831 | 9/1986 | Higashino et al. ................ 307/270 |
| 4,648,020 | 3/1987 | Vinciarelli . |
| 4,675,797 | 6/1987 | Vinciarelli . |
| 4,688,160 | 8/1987 | Fraidlin . |
| 4,695,932 | 9/1987 | Higashino . |

Primary Examiner—Emanuel T. Voeltz
Attorney, Agent, or Firm—Foley & Lardner

[57] ABSTRACT

A DC to DC converter has a transformer with a highly coupled primary and secondary, a first switch connected in series between a current source and the primary, a second switch connected across the current source in parallel with the first switch and the primary, a rectifier connected to rectify the output of the secondary, an energy storage device such as a capacitor connected to receive the output from the rectifier, and a load connected to receive output voltage across the capacitor. The current source which provides the substantially constant current can be a superconducting storage magnet. The first and second switches are controlled to alternately open and close to provide current through the primary of the transformer to recharge the energy storage device. When voltage across the energy storage capacitor reaches a minimum level, the one of the first and second switches which was closed is opened and the other is closed. This cycle is repeated as the voltage across the output capacitor reaches the minimum value to maintain the output voltage substantially at a constant level.

21 Claims, 9 Drawing Sheets

HIGH EFFICIENCY DC/DC CURRENT SOURCE CONVERTER

FIELD OF THE INVENTION

This invention pertains generally to DC to DC power converters and particularly to converters for supplying controlled DC power from a DC current source such as a superconducting storage magnet.

BACKGROUND OF THE INVENTION

A Variety of circuit designs have been developed for DC to DC power conversion. Such circuits typically provide power from a DC source at one voltage level to a load at a controlled voltage or power level. Typical converter circuits use semiconductor devices, such as power transistors, silicon controlled rectifiers (SCRs), Gate-Turn-Off (GTO) devices, Insulated-Gate-Bipolar-Transistors (IGBT), and so forth. Of particular interest in the design of such circuits are the voltage and current control obtained at the output and the efficiency and cost of the circuit.

While conventional DC to DC converter circuits convert power from a voltage source, such circuits are not well suited to converting power from a current source, such as a superconducting electrical storage magnet. Examples of circuits for supplying power to and delivering power from superconducting storage magnets are shown in the patents to the first switch and the primary of the transformer. The secondary of the transformer is connected through a rectifier to an energy storage device, such as a large capacitor or battery, which is charged by the current from the secondary and which supplies a substantially constant or controllable output voltage to a load connected across the energy storage device. For maximum efficiency, it is preferred that a full-wave rectifier is utilized at the secondary of the transformer to rectify the current provided to the energy storage device.

In operation, the second or bypass switch, which is connected across the current source, is initially closed, so that the current from the current source circulates through the bypass switch. The first switch, connected in series with the primary of the transformer, is open. Upon initiation of a cycle, the first switch is closed and the second switch is opened, which causes the current in the primary and secondary to increase rapidly. A bypass resistor across the second switch controls the maximum voltage applied to the primary of the transformer. The voltage across the energy storage device in the secondary increases as current flows into it up to a maximum level and then declines again as the current in the secondary of the transformer declines to zero. When the voltage across the storage device reaches a selected minimum level, the second switch is closed, and the first switch is opened, causing the current in the primary to be shunted through a bypass resistor connected across the first switch and rapidly decline to zero. The current in the secondary rapidly reaches a maximum and then declines steadily. This results in an increase in the output voltage across the energy storage device as the current flows through it until it reaches a maximum, and then the output voltage declines as the current in the secondary declines and reaches zero. When the voltage across the storage device reaches the selected minimum level, the first switch is again closed and the second switch is again opened to initiate a new cycle. The cycle of alternately opening and closing the Peterson, et al., U.S. Pat. Nos. 4,079,305 and 4,122,512. An example of a circuit for supplying power unidirectionally from a current source to a voltage load is shown in U.S. Pat. No. 4,675,797 to Vinciarelli.

When supplying power from a superconducting energy storage magnet, a significant consideration is that the storage magnet often carries very large currents which must be switched. Since energy is lost in switching operations, particularly in semiconductor switches, conventional DC to DC converter circuits which utilize fast-switching semiconductor switches have significant inefficiencies in the switching system, as well as typically requiring numerous high cost switching components connected in parallel to adequately handle the large currents being switched.

SUMMARY OF THE INVENTION

In accordance with the present invention, a DC to DC converter accepts power from a current source, such as a superconducting storage magnet, and delivers the power at controllable voltage and current levels to a load with high efficiency while minimizing the switching elements required. For use with a superconducting storage magnet as the current source, very low frequency, high efficiency mechanical or superconducting switches can be utilized which switch at relatively low switching frequencies (e.g., 0.1–10 Hz). Depending on the use, and the current provided from the current source, higher frequency semiconductor switches can be utilized while still achieving high overall efficiency for the conversion circuit.

The DC to DC converter of the invention has a highly coupled transformer, which may be either air core or iron core, the primary of which is fed from the current source and the secondary of which is connected to the load. A first controllable switch is connected in series with the primary of the transformer and a second controllable switch is connected across the current source and in parallel with two switches is repeated as long as power is to be supplied to the load. Thus, the voltage across the load is controlled by selecting the minimum voltage level at which switching occurs, and this level can be selected as desired to maintain the desired voltage across the load. By utilizing a capacitor as the energy storage device, the speed at which output voltage levels will change can be selected by selecting the size of the capacitor relative to the load to yield a desired charge and discharge time constant.

Where loads are encountered that have relatively slowly changing power requirements, very slow switching devices can be utilized for the first and second switches, such as mechanical switches or superconducting switches. Where more rapidly changing power draw requirements are encountered, semiconductor switches may be utilized. The relatively long switching cycles required in the present invention to maintain the desired voltage across the load give the maximum efficiency possible, and particularly adapt the invention for use with a superconducting energy storage magnet where large currents must be switched in a high efficiency manner. The circuit can be utilized to supply power from a current source to an uninterruptible power supply system which supplies power to, e.g., a motor, computer, or another critical load, and, in general, for converting the energy stored in a superconducting energy storage magnet to a selectable voltage level which may be utilized in a conventional manner, e.g., by being inverted to AC power at a selected frequency.

Further objects, features and advantages of the invention will be apparent from the following detailed description when taken in conjunction with the accompanying drawings.

DETAILED DESCRIPTION OF THE INVENTION

The DC/DC converter of the present invention is based on simple elements to control the output power (voltage and current) delivered from a constant current energy source, such as superconductive magnetic energy storage (SMES) devices. The basic circuit elements consist of: (1) a highly coupled transformer (air core or iron core with coupling coefficient, k, preferably better than 95%); (2) low frequency (0.1-10 Hz) mechanical or superconductor switches or high frequency (10-1000 Hz) GTO switches, depending on the use; (3) and small energy storage voltage sources (capacitor or battery) to control the output voltage.

Figure 1:
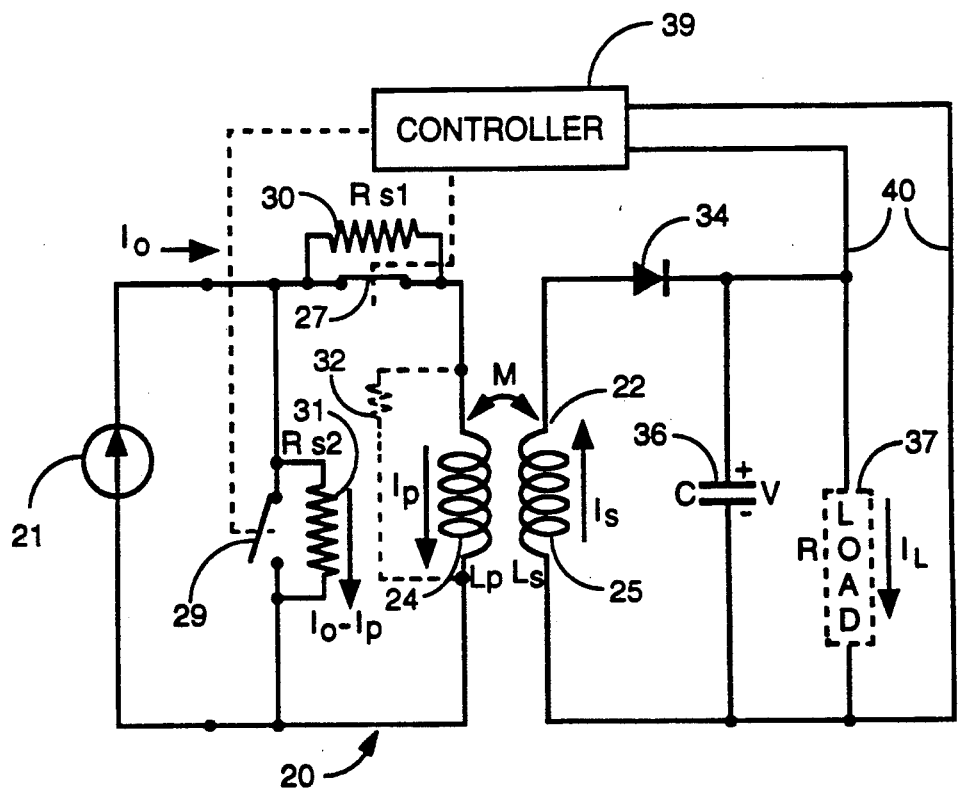
FIG. 1 is a schematic diagram of a basic DC current to DC voltage converter in accordance with the invention.

A basic DC/DC converter system in accordance with the invention is shown generally at 20 in FIG. 1. The converter system 20 has a DC current source 21 proving a current $I_o$, a transformer 22 having a closely coupled primary 24 and secondary 25 (of mutual inductance M, primary self inductance $L_p$ and secondary self inductance $L_s$), a first switch 27 connected in series between the source and the primary 24 of the transformer, and a second or bypass switch 29 connected across the source 21 and in parallel with the first switch 27 and the primary 24. A bypass resistor 30 is connected across the first switch 27 and a bypass resistor 31 is connected across the switch 29, although it is understood that a single bypass resistor (shown at 32 in dashed lines) may be equivalently connected across the primary, which is effectively a resistance connected in parallel with both the first and second switches. A rectifying device 34 is connected to rectify the output of the transformer secondary 25 and provide unidirectional current to an energy storage capacitor 36 and a load 37 connected in parallel. The operation of the switches 27 and 29 is controlled by a controller 39, which also has lead lines 40 connected to monitor the output voltage V across the load 37 and the capacitor 36. The following describes the operation of this circuit under the control of the controller 39 (e.g., a programmed microprocessor with ancillary A/D converters and drivers for the switches 27 and 29, or other suitable controller of conventional design).

Initially the switch 29 is closed, short circuiting the constant source current $I_o$ through it. To start the cycle, the first switch 27 is closed and then the second switch 29 is opened. The constant source current $I_o$ which was short circuited by the switch 29 is diverted into the primary of the highly coupled transformer. The current $I_p$ builds up quickly in the primary as, $$I_p = \left(I_o - \frac{kV}{NR_{S2}}\right)(1 - e^{-t/\tau_1})$$

$$\approx I_o(1 - e^{-t/\tau_1}),$$

where $$\tau_1 = \frac{L_p(1 - k^2)}{R_{S2}},$$

and $L_s$ and $L_p$ are the inductances of the transformer primary and secondary ($L_s = N^2 L_p$), M is the mutual inductance ($M = k(L_s L_p)^{\frac{1}{2}}$), N is the transformer turns ratio, and $R_{S2}$ is the resistance of the resistor 31. The secondary current $I_s$ is, $$I_s = -\frac{Vt}{N^2}L_p + \frac{k}{N}\left(I_o - \frac{kV}{NR_{S2}}\right)(1 - e^{-t/\tau_1})$$

$$\approx \frac{kI_o}{N}(1 - e^{-t/\tau_1})$$

where

-continued $$\tau_c = \frac{kI_o NL_p}{V}.$$

The above simple analysis assumes the voltage across the load 37 (or across the capacitor 36) does not change during charge or discharge. This is true for a very large capacitor 36 or for a battery used in place of the capacitor as an energy storage device The variation of the output voltage during the cycle is small if a large capacitor is used. The initial value of $I_s$ (t=0) is larger than the load current $I_L$ ($kI_o/N > I_L$). For a certain time, the power flow through the transformer is used to charge the capacitor (or battery) and supply the load. At a certain time $t_c$ before $I_s$ drops below $I_L$, the switch 29 is closed and the switch 22 is opened, dissipating the energy stored in the transformer and ending the charge period. At this time the capacitor 36 (or battery) delivers the energy stored in it during the charge time to the load up to its initial charge. For a purely resistive load, $R_L$, the discharge time $t_d$ is:

$$t_d = R_L C \ln (V_{max}/V_{min})$$

where $V_{min}$ and $V_{max}$ are the voltage permitted across the capacitor (of capacitance C) at the beginning and the end of the charge time. The diode 34 prevents discharging back into the transformer. The process is repeated periodically over a cycle time $\tau = t_c + t_d$. The source of losses in this circuit are the switches 27 and 29 and their bypass resistors 30 and 31 It can be shown that the efficiency of this circuit for highly coupled transformers (k>0.9) is approximately, $$\eta = \frac{2\alpha k^2 - \alpha^2 k^2}{2 + 2\alpha k^2 - 2k^2},$$

where $$\alpha = t_c/\tau_c.$$

The maximum efficiency $\eta_{max}$ occurs at $$t_c = \frac{\sqrt{1-k^4} - 1 + k^2}{k^2}.$$

Figure 2:
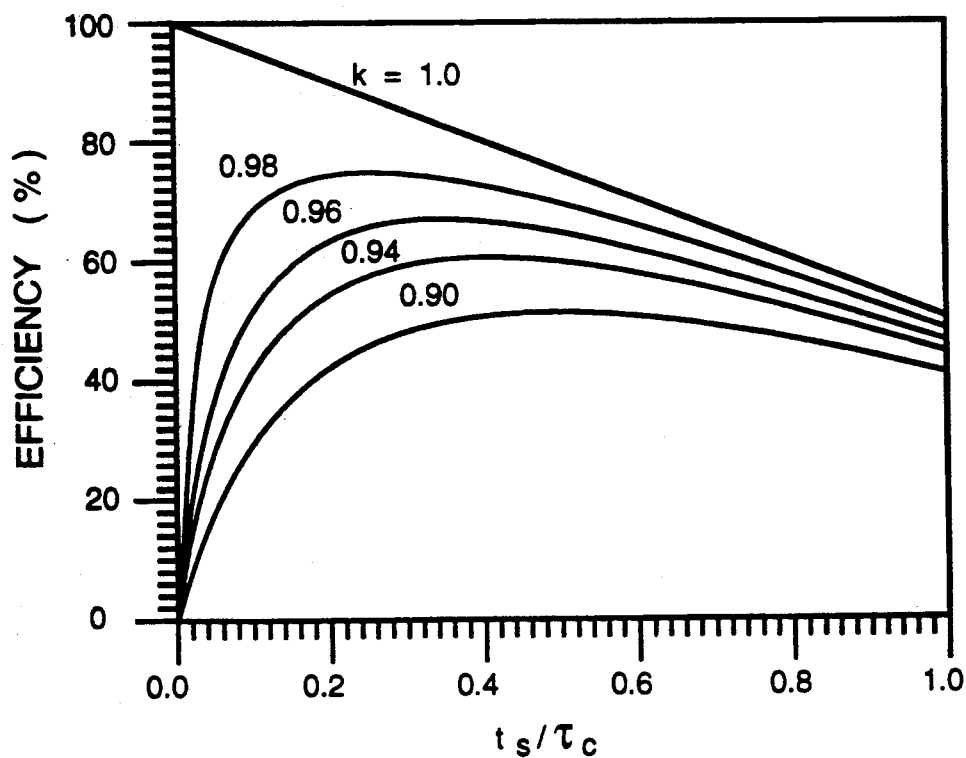
FIG. 2 are graphs showing converter efficiency versus (scaled) switching time for various values of the transformer coupling coefficient, k, for the circuit of FIG. 1.

As shown by the equation above for $\eta$ and in FIG. 2, the maximum efficiency $\eta_{max}$ is practically a function of the transformer coupling coefficient, k. Efficiencies as high as 85% for k=0.995 are possible. The switching times $t_c$ and $t_d$ can be made large enough to conform with the desired output voltage V and the load current $I_L$, $I_L < I_s$, through proper choice of the transformer turns ratio, N, and the inductances $L_s$ and $L_p$. This circuit can be used to step up or down the current supplied to the load at the desired output voltage V.

Figure 3:
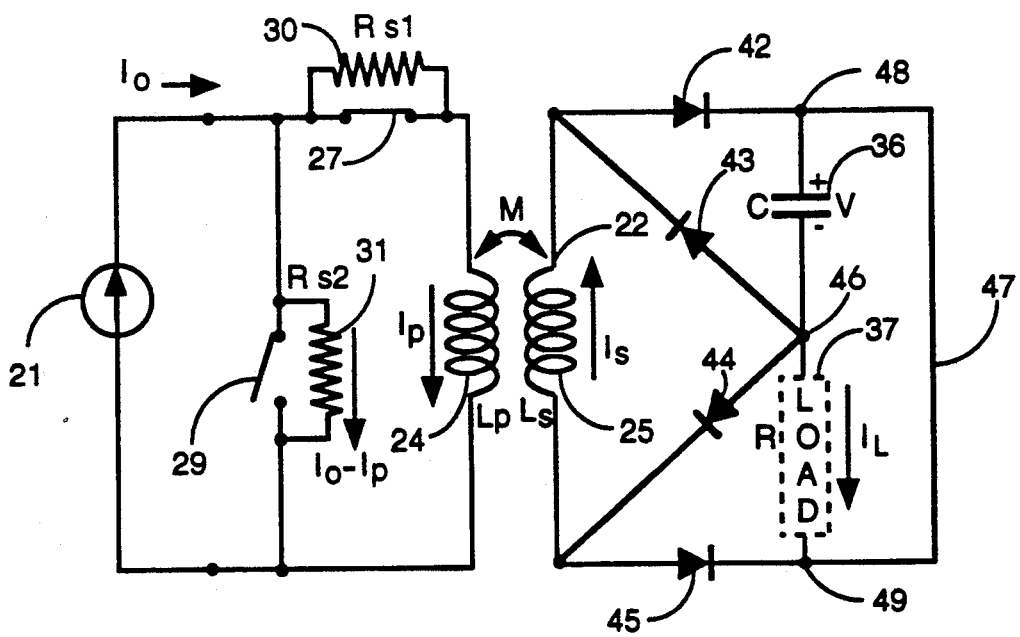
FIG. 3 is a schematic circuit diagram of a preferred DC current to DC voltage converter in accordance with the present invention.

A more efficient inverter system is shown in FIG. 3. The system of FIG. 3 is identical to that of FIG. 1 except that a full bridge of diodes 42 through 45 provides full wave rectified power to the capacitor 36 and load 37, with the DC output voltage provided across a first node 46 and nodes 48 and 49 connected by a line 47 (which together comprise one second output node). The circuit of FIG. 3 provides current paths through the transformer secondary coil in both current directions.

Figure 4:
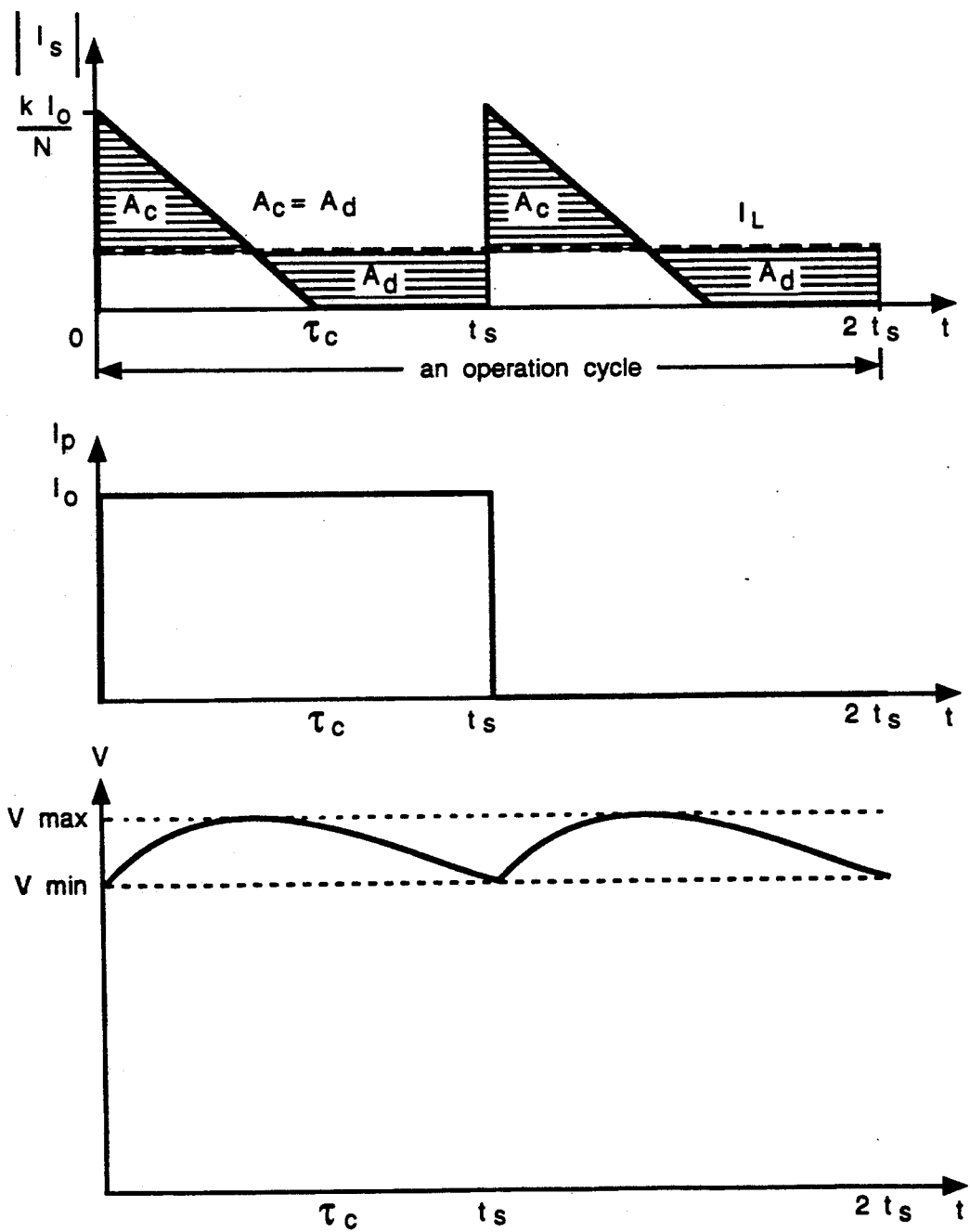
FIG. 4 are graphs showing the transformer currents and output voltage over a complete cycle for the converter of FIG. 3.

When either the switch 27 or 29 is opened in this circuit, the energy loss ($E_{loss}$) in the switch bypass resistor is equal to the energy change in the transformer, i.e., $$E_{loss} = \tfrac{1}{2} L_p (1-k^2)(\Delta I_p)^2,$$

where $\Delta I_p$ is the change of $I_p$. The loss is small if the coupling of the transformer is good (k>0.95). The operational cycle, as illustrated in the transformer current and output voltage graphs of FIG. 4, is as follows:

Close switch 27 and open switch 29. $I_p$ jumps from 0 to $I_o$ thereafter Shortly thereafter $I_s$ initially jumps to $kI_o/N$ and then decreases approximately linearly until it reaches zero. The capacitor voltage, V, first goes up, peaks at $I_s = I_L$, and falls back to $V_{min}$. The energy loss dissipated in the switch resistor 31 is the initial energy change in the transformer, $$E_{loss} = \tfrac{1}{2} L_p (1-k^2) I_o^2,$$

and the energy delivered equals the initial energy stored in the secondary coil, $$E_{d1} = \tfrac{1}{2} L_s \left(\frac{kI_o}{N}\right)^2 = \tfrac{1}{2} k^2 L_p I_o^2$$

When V falls back to $V_{min}$ at $t_s$, close switch 29 and open switch 27 shortly thereafter. $I_p$ falls exponentially from $I_o$ to zero with a very short time constant $\tau = L_p(1-k^2)/R_{s1}$, which pumps $I_s$ from zero to $-kI_o/N$, starting the second half of the cycle; that half cycle is exactly the same as the first half except that $I_s$ is in the opposition direction. $R_{s1}$ is the value of the resistor 30. The energy loss and the energy delivered in the second half cycle are the same as in the first half. Thus, the total energy loss during a complete cycle is $$E_{loss} = L_p(1-k^2)I_o^2,$$

and the total energy delivered is $$E_d = k^2 L_p I_o^2.$$

The efficiency of the converter is $$\eta = \frac{E_d}{E_d + E_{loss}} = k^2.$$

Figure 5:
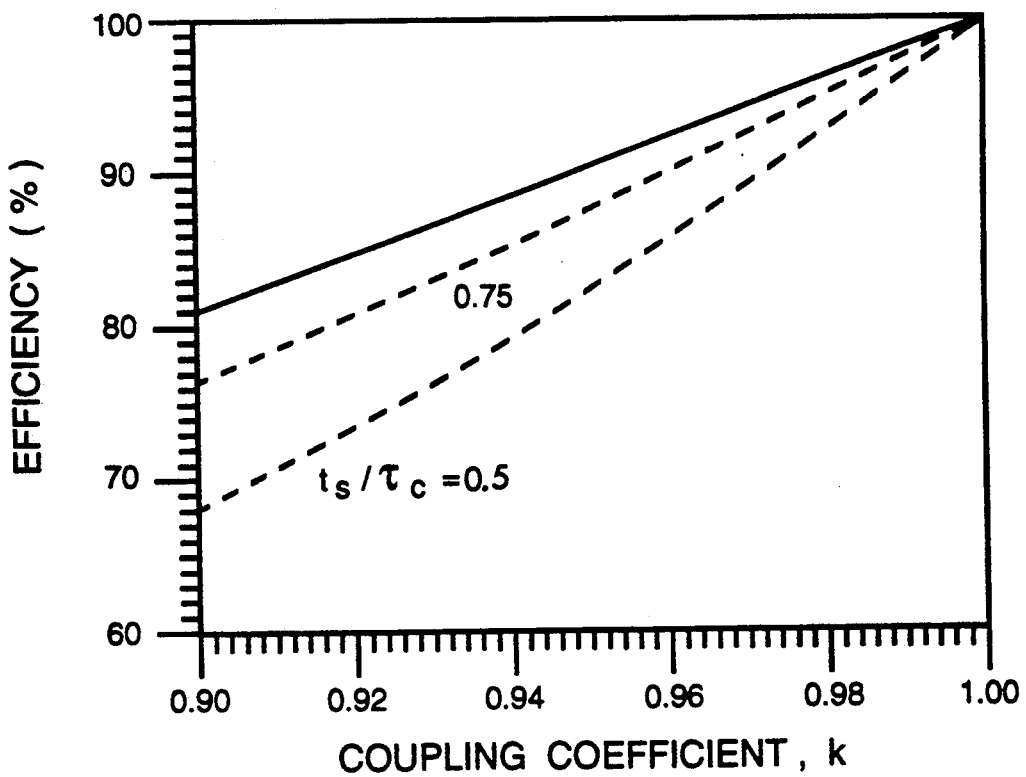
FIG. 5 are graphs showing the efficiency of the circuit of FIG. 3 as a function of the transformer coupling coefficient, k, at various values of (scaled) switching time $t_s/\tau_c$.

FIG. 5 plots the efficiency as a function of coupling coefficient k. It shows that the converter has very high efficiency. Also shown are the efficiencies where the switch 27 is opened before $I_s$ drops to zero ($t_s < \tau_c$). $t_s$ in general should be greater than $\tau_c$, but the converter can also be operated at $t_s < \tau_c$, which would be less efficient, i.e., $$\eta = \frac{k^2 (t_s/\tau_c)}{k^2 (t_s/\tau_c) + 1 - k^2}.$$

The switching time, $t_s$, can be made as long or short as necessary to meet the desired application by selecting proper transformer parameters.

Various types of switch constructions can be used for the switches 27 and 29. Mechanical switches have the advantage of an infinite reverse resistance and very small forward resistance. They can be solenoid actuated and can have a switching frequency typically of up to 10 Hz. Superconducting switches have the advantage of zero forward resistance and the disadvantage of finite reverse resistance. They are appropriate only for low frequency applications and can be expensive. GTO (Gate-Turn-Off) solid state switches have the advantage of extremely fast response (1000 Hz) and the disadvantage of large forward resistance (1.5-2 volts drops). They can thus be inefficient, particularly in large current applications.

In certain applications, a highly efficient battery may be used as the energy storage device rather than the capacitor. A battery will generally be of smaller size than a comparable capacitor, will yield smaller fluctuations in output voltage (the battery voltage change during charging is smaller), and will generally be less efficient due to losses in the battery. The switching time is selected to achieve energy balance such that the energy delivered per cycle is equal to the output energy plus losses.

The DC/DC converter system of the invention can be utilized in a variety of applications. The converter can be used to step down or step up DC current at a prescribed output voltage. The use of superconducting magnets as a high-power energy storage element in uninterruptible power devices has been recently recognized and commercialized. The major losses in these units are in the current leads and the switching GTOs (both losses are proportional to currents). By using a smaller current magnet and the present DC/DC converter to step up the current to the desired value at the desired voltage, the losses can be significantly reduced. The converter can also be used for high efficiency energy transfer from an energy storage magnet to another storage magnet, or to a load, replacing conventional thyristor bridges, and as a charge or discharge circuit for an energy storage magnet coupled with the option of stepping down or up the charge current The converter of the invention has several advantages. First, output voltage and current can be held constant during operation even though the input current I may drop because the input energy source is finite in size. This can be achieved three ways: (1) by controlling the switching times of the switches 27 and 29 (see the two examples discussed below); (2) by adjusting the transformer turns ratio, N; and (3) by a combination of both 1 and 2 which allows more flexibility. Second, ease of power control at the output side through changing the capacitor voltage. At constant voltage, the circuit delivers constant power. Third, high efficiency is possible if the switching time of the switches 27 and 29 is kept above $0.5\tau_c$. The efficiency is $k^2$. By using a highly coupled transformer ($k \geq 0.95$), the efficiency can be made better than 90%. The losses occur in the bypass resistors 30 and 31. By placing the switches 27 and 29 in a cryogenic environment, small leads can be used to carry the current to resistors maintained at room temperature so that the refrigeration power is kept to a minimum.

Figure 6:
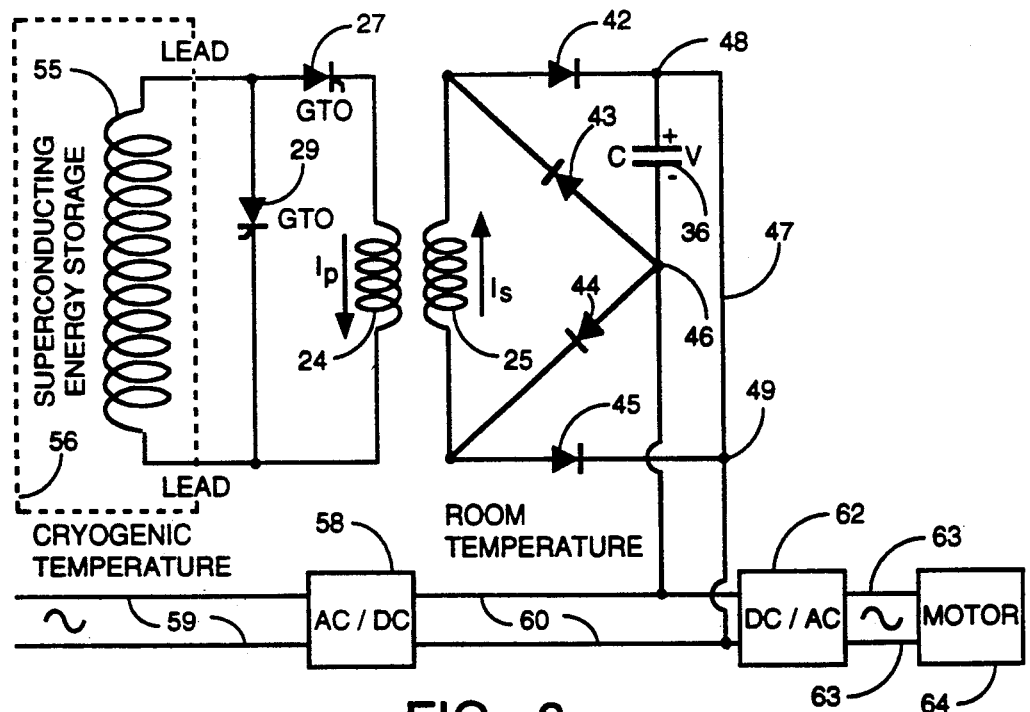
FIG. 6 is a schematic circuit diagram of a converter circuit in accordance with the invention which connects a low current superconducting energy storage magnet to supply high power to an uninterruptible power supply which operates a motor.
Figure 7:
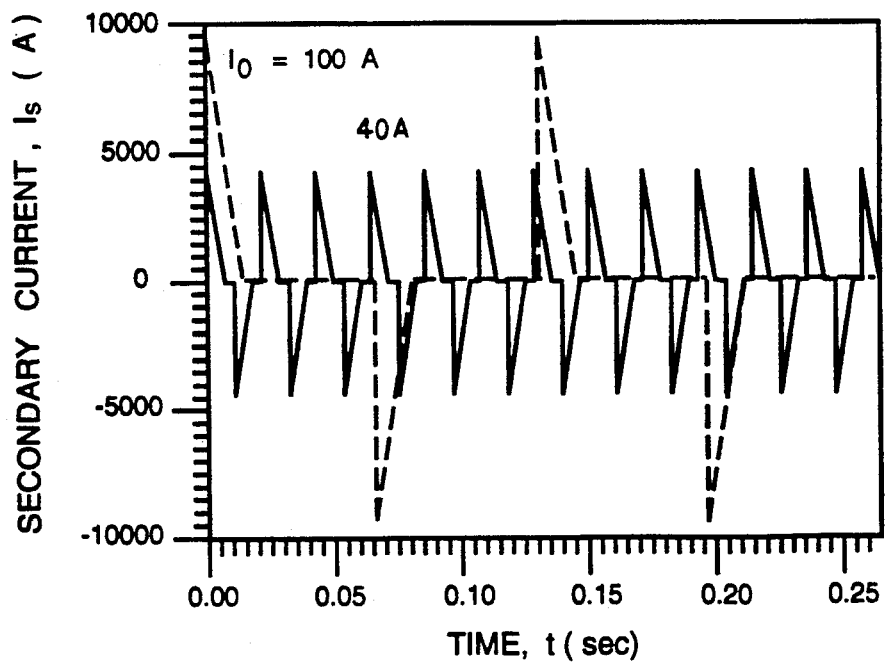
FIG. 7 are plots of converter secondary current $I_s$ as a function of time for two different levels of source current $I_o$.
Figure 8:
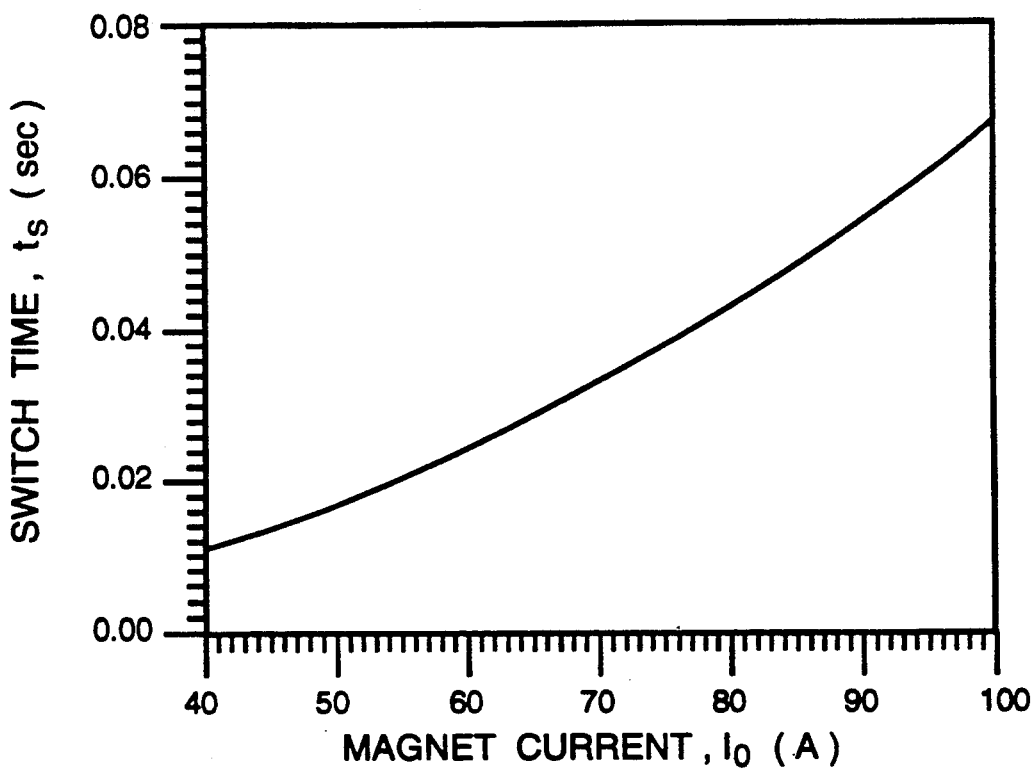
FIG. 8 is a graph of switching time vs. source magnet current $I_o$ for an exemplary converter circuit in accordance with the invention.
Figure 9:
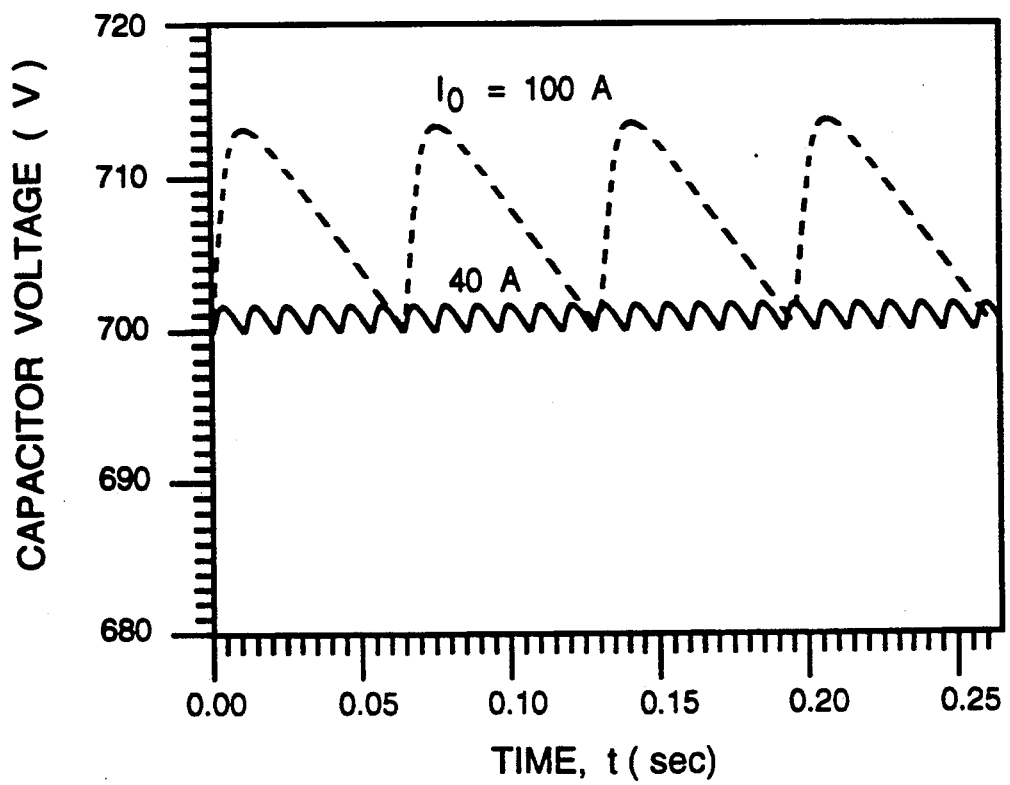
FIG. 9 are graphs of the output voltage V as a function of time in an exemplary converter circuit in accordance with the invention at two different levels of source current.
Figure 10:
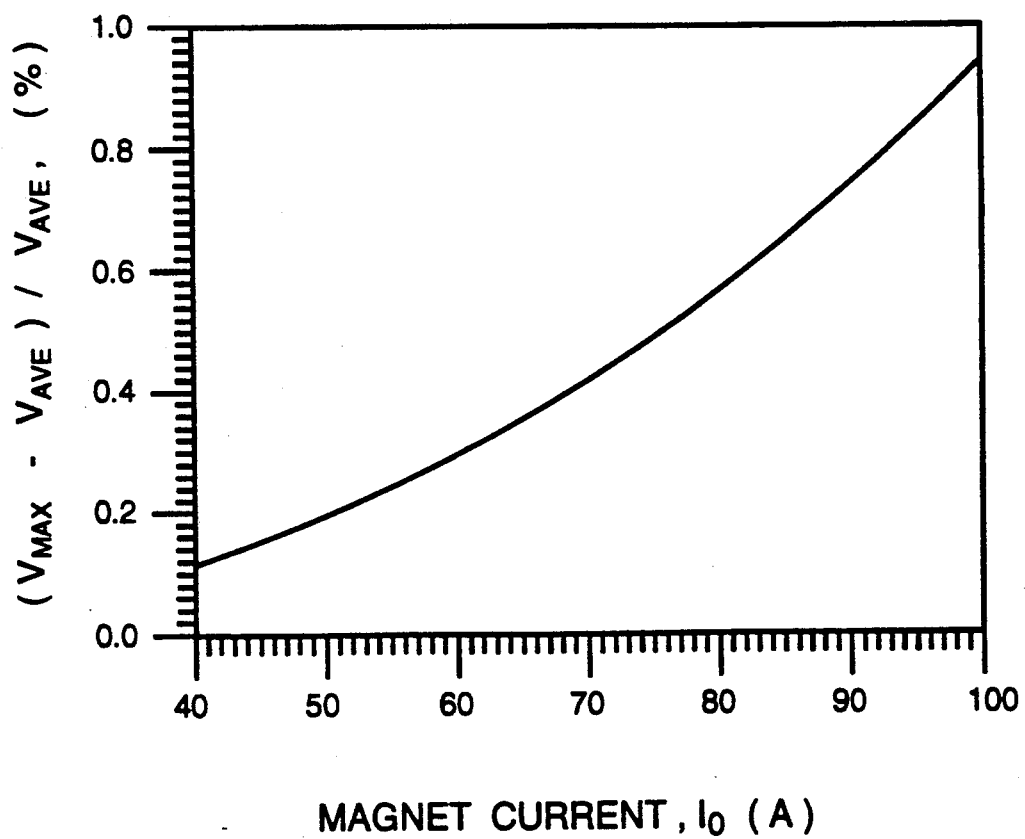
FIG. 10 is a graph showing output voltage regulation as a function of the source current in an exemplary converter in accordance with the invention.

FIG. 6 shows a first example circuit for current step-up from 40-100 A to 1000 A where a small superconducting energy storage magnet carries a low current. If a large energy storage magnet is used (e.g., carrying 1000A) large losses can occur in the current leads and because of the continuous flow of the 1000 A current through GTO switches. The converter of the invention can link a more efficient low current source to the desired 1000 A output. The constant current source is a superconducting energy storage magnet 55 within a cryogenic enclosure 56. The switches 27 and 29 are GTOs. The DC output of the converter is used as the back-up energy source for an uninterruptible power supply which includes an AC to DC converter 58 receiving AC power on lines 59 and providing DC power on DC bus lines 60. The DC voltage across the capacitor 36 is provided to the DC bus lines 60. The DC voltage on the bus lines 60 is provided to a DC to AC inverter 62 which provides AC power on lines 63 to an AC load, such as an AC motor 64. The low current, small magnet source 55 is at cryogenic temperature and is connected through two low current leads to the converter circuit. The converter interfaces the low current storage magnet to a high current (e.g., 1000 A, 700V) uninterruptible power supply. This circuit achieves a significant reduction (−90%) in both the lead and GTO losses compared to a converter operating on high currents from a storage magnet. The converter circuit is designed to drain most of the energy stored in the magnet coil at the source side. FIG. 7 shows the secondary coil current $I_s$ for $I_o=100$ A and $I_o=40$ A. The smaller the value of $I_o$, the shorter the switching time, as shown in FIG. 8. Since the switching time is short, GTO's are the preferred switching devices for this particular example. FIGS. 9 and 10 show the output voltage variation and regulation. Small capacitors can be used if more voltage variations are allowed.

Figure 11:
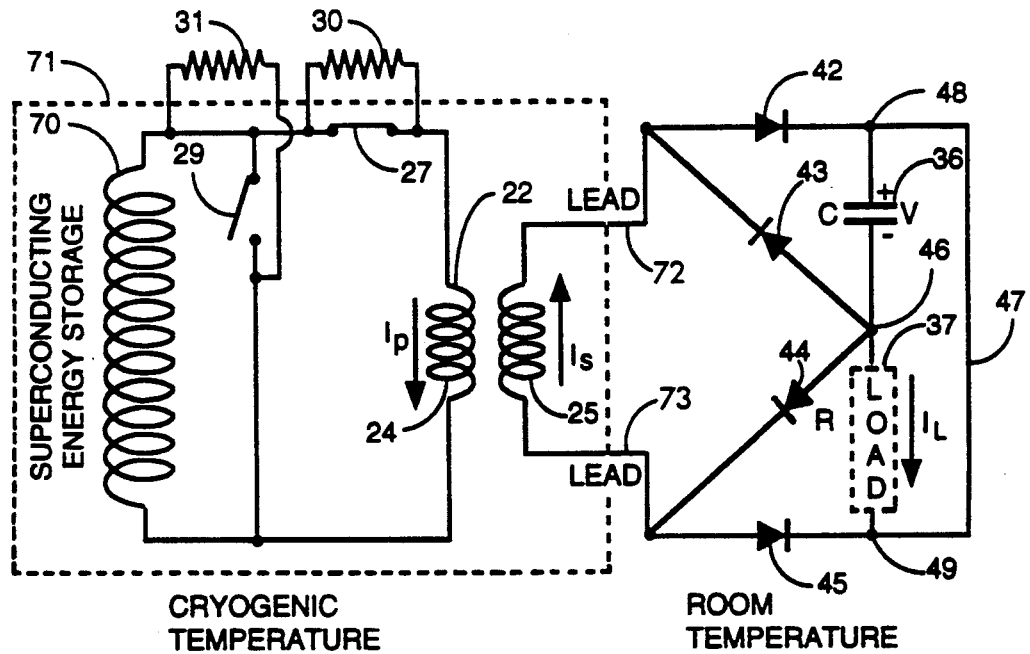
FIG. 11 is a schematic circuit diagram of an exemplary converter in accordance with the invention providing power from a large superconducting energy storage magnet having high current to a low power load.
Figure 12:
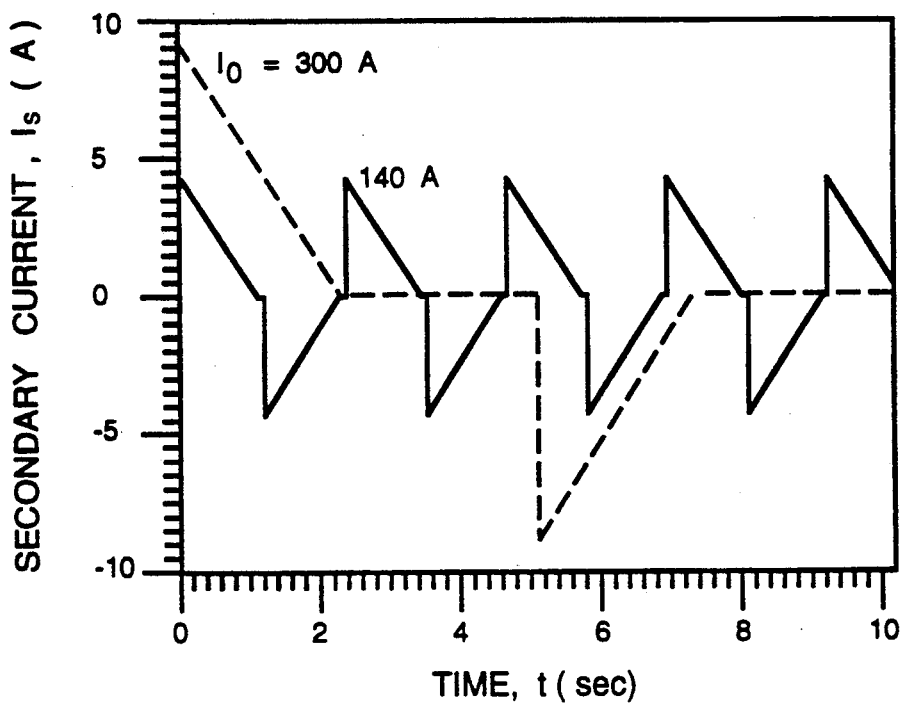
FIG. 12 are graphs of converter secondary current $I_s$ as a function of time for two different source currents $I_o$.
Figure 13:
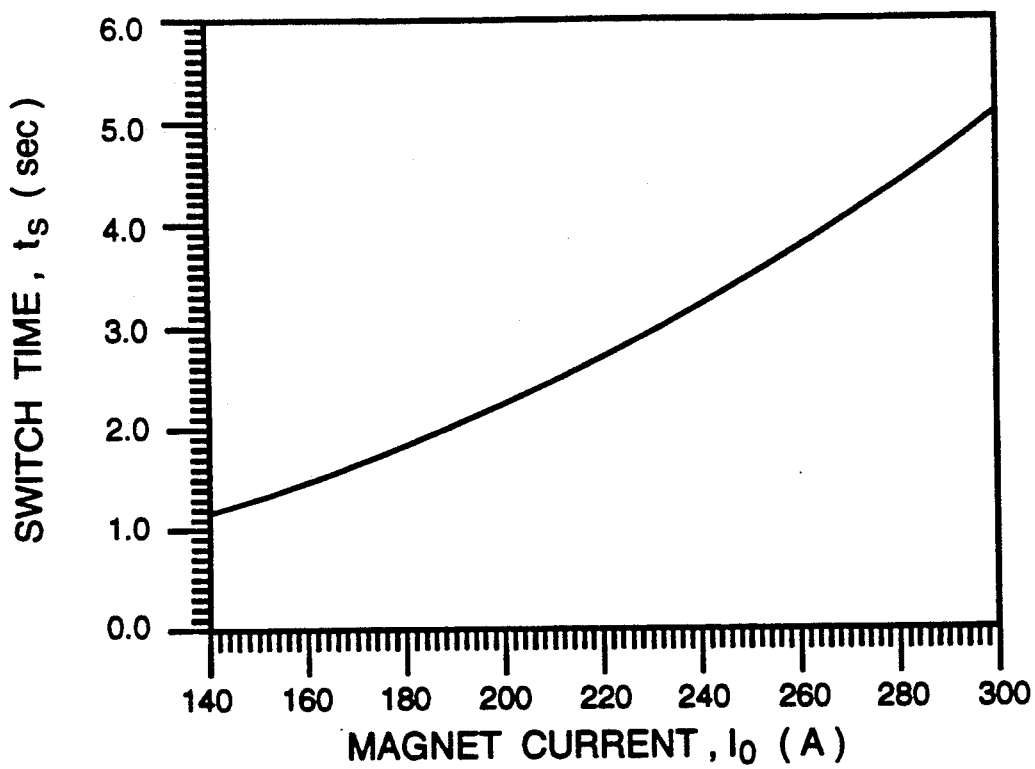
FIG. 13 is a graph of switching time t, versus source magnet current I for the converter of FIG. 11.
Figure 14:
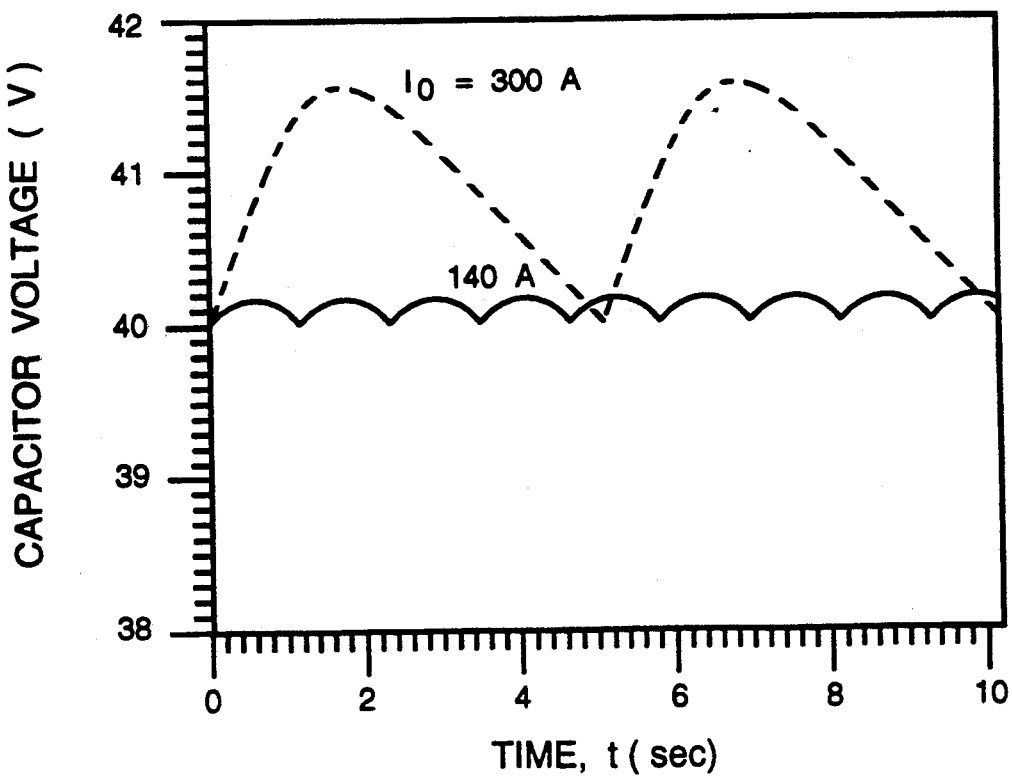
FIG. 14 are graphs of the output voltage as a function of time at two different levels of source current $I_o$ for the converter of FIG. 11.
Figure 15:
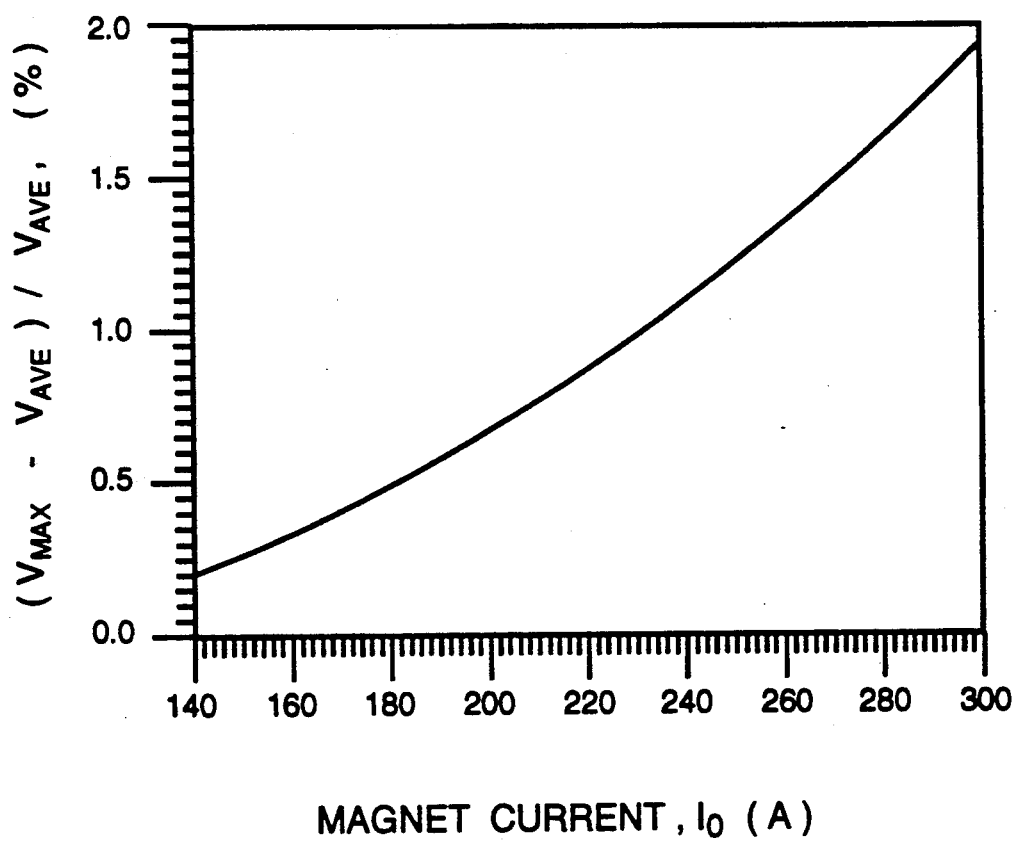
FIG. 15 is a graph of output voltage regulation as a function of source magnet current $I_o$ for the converter of FIG. 11.

FIG. 11 shows a second example of the converter of the invention connected to a large superconducting coil 70 within a cryostat 71 to deliver low power low current (2 A) to a load. Large superconducting coils require large current conductors for ease of construction and protection. The converter provides a current step down from, e.g., a 300 A–140 A source to 2A output at 40 volts. In this case, the source coil 70, the lower frequency switches 27 and 29 ($t_s > 1$ sec) and the transformer 22 are all at cryogenic temperature within the cryostat 71, with two 9.2A maximum current leads 72 and 73 connecting to the room temperature side of the cryostat. Another advantage of this circuit is that for a conventional circuit, switching times would be very short compared to the 1-5 sec. of the present converter. Thus, the present converter can use virtually lossless high current mechanical switches rather than lossey GTO's. FIGS. 13-15 show the current, output voltages and voltage regulation for this circuit.

Exemplary circuit specifications for the circuits of FIGS. 6 and 11 are given in the table below.

TABLE

| Example Circuit Specifications | | |
| --- | --- | --- |
| | Example 1 (Current Step Up) | Example 2 (Current Step Down) |
| $L_p$ | 10 H | 0.01 H |
| $L_s$ | 0.001 H | 10 H |
| k | 0.97 | 0.97 |
| Efficiency | 94.1% | 94.1% |
| C | 4 F | 4 F |
| $R_L$ | .7Ω | 20Ω |
| Switching Time, $t_s$ | 0.0107-0.659 sec | 1.146-5.060 sec |
| Magnet Op. Current, $I_o$ | 40-100 A | 140-300 A |
| Output Current | 1000 A | 2 A |
| Maximum Lead Current | 100 A | 9.2 A |
| Output Voltage | 700 V | 40 V |
| Output Power | 700 kW | 80 W |

What is claimed is:

1. A converter accepting DC current from a DC current source to supply power to a load, comprising:
    (a) a transformer having a highly coupled primary and secondary;
    (b) a first controllable switch connected in series with the primary;
    (c) a second controllable switch connected in parallel with the series combination of the first switch and the primary and connectable to the current source to bypass the current from the current source therethrough when the second switch is closed;
    (d) resistance connected in parallel with the first and second switches;
    (e) rectifying means connected to the secondary for rectifying the output of the secondary to provide unidirectional output current;
    (f) an energy storage device connected across the output of the rectifying means and connectable in parallel with the load, the energy storage device being chargeable by the current from the rectifying means to maintain a voltage therefrom; and
    (g) control means for controlling the switching of the first and second switches to alternately open and close to charge the energy storage device and maintain a voltage thereacross.

2. The converter of claim 1 wherein the rectifying means comprises a diode connected between the secondary and the energy storage device.

3. The converter of claim 1 wherein the rectifying means comprises a full bridge of diodes connected to the secondary of the transformer and having output terminals providing full-wave rectified voltage therefrom to the parallel connected energy storage device and load.

4. The converter of claim 1 wherein the energy storage device is a capacitor.

5. The converter of claim 4 wherein the switches are controlled to alternately open and close at switching times at which the output voltage across the energy storage capacitor and the load reaches a selected minimum level.

6. The converter of claim 1 wherein the switching of the controllable switches is controlled so that when the first switch is initially open and the second switch is initially closed, the first switch is closed before the second switch is opened, and such that when the first switch is closed and the second switch is open, the second switch is closed before the first switch is opened.

7. The converter of claim 1 wherein the controllable switches are selected from the group consisting of mechanical switches, GTOs, and superconductor switches.

8. The converter of claim 1 wherein the coupling coefficient of the transformer is at least 0.9.

9. The converter of claim 1 including a superconducting energy storage magnet connected as the current source to the converter to provide DC current through the first switch to the primary of the transformer and to be bypassed by the second switch when it is closed.

10. A converter accepting DC current from a DC current source to supply power to a load, comprising:
    (a) a transformer having a highly coupled primary and secondary;
    (b) a first controllable switch connected in series with the primary;
    (c) a second controllable switch connected in parallel with the series combination of the first switch and the primary and connectable to the current source to bypass the current from the current source therethrough when the second switch is closed;
    (d) resistance connected in parallel with the first and second switches;
    (e) rectifying means connected to the secondary for rectifying the output of the secondary to provide unidirectional current;
    (f) an energy storage capacitor connected across the rectifying means, the voltage across the capacitor comprising the output voltage of the converter for supply to the load; and
    (g) control means for controlling the switching of the first and second switches to alternately open and close to maintain a controlled voltage across the energy storage capacitor.

11. The converter of claim 10 wherein the control means switches the switches to alternately open and close when the output voltage across the energy storage capacitor reaches a selected minimum voltage level.

12. The converter of claim 10 wherein in the rectifying means comprises a diode connected between the secondary and the energy storage capacitor.

13. The converter of claim 10 wherein the rectifying means comprises a full bridge of diodes connected to the secondary of the transformer and having output terminals providing full-wave rectified voltage therefrom to the energy storage capacitor.

14. The device of claim 10 wherein the switching of the controllable switches is controlled so that when the first switch is initially open and the second switch is initially closed, the first switch is closed before the second switch is opened, and such that when the first switch is closed and the second switch is open, the second switch is closed before the first switch is opened.

15. The converter of claim 10 wherein the controllable switches are selected from the group consisting of mechanical switches, GTOs, and superconductor switches.

16. The converter of claim 10 wherein the coupling coefficient of the transformer is at least 0.9.

17. The converter of claim 10 including a superconducting energy storage magnet connected as the current source to the converter to provide DC current through the first switch to the primary of the transformer and to be bypassed by the second switch when it is closed.

18. A method of controlling a DC current to DC voltage converter of the type receiving current from a current source and having a transformer with a closely coupled primary and secondary, a first switch connected in series with the primary, a second switch connected in parallel with the series connected first switch and the primary, a rectifying device for rectifying the output of the secondary, and an energy storage capacitor connected to receive the unidirectional current from the rectifying device, with the output voltage of the converter being taken across the energy storage capacitor, comprising the steps of:
    (a) initially closing the second switch to cause the current from the current source to bypass the primary;
    (b) closing the first switch and opening the second switch to cause the current from the current source to pass into the primary and to provide an output from the secondary which charges up the voltage across the energy storage capacitor;

(c) when the voltage across the capacitor reaches a selected minimum voltage level, closing the second switch and opening the first switch to bypass the current from the current source through the second switch;

(d) when the voltage across the capacitor reaches the selected minimum voltage level, closing the first switch and opening the second switch to provide the current from the current source through the primary;

(e) then repeating steps (c) and (d) in a repetitive cycle for as long as power is to be provided from the converter to the load.

19. The method of claim 18 wherein when the first switch is closed and the second switch is open, the second switch is closed for a short period of time before the first switch is opened, and wherein when the first switch is open and the second switch is closed, the first switch is closed for a short period of time before the second switch is opened.

20. The method of claim 18 including providing a bypass resistance path around the first switch to dissipate energy stored in the transformer when the first switch is opened by conducting the current from the transformer through the bypass resistance around the first switch.

21. The method of claim 18 including providing a bypass resistance path around the second switch to limit the voltage across the primary of the transformer when the second switch is opened by conducting current from the source through the bypass resistance around the second switch.

* * * * *